(12) United States Patent
Donich et al.

(10) Patent No.: US 8,032,078 B1
(45) Date of Patent: Oct. 4, 2011

(54) WAYSIDE MONITORING SYSTEMS

(75) Inventors: Thomas G. Donich, Seeley Lake, MT (US); Paul F. Kulik, Seattle, WA (US); David B. Kelley, Normandy Park, WA (US); Richard J. Fulthorp, Renton, WA (US); Dale K. Smith, Renton, WA (US)

(73) Assignee: MeteorComm, LLC, Renton, WA (US)

( * ) Notice: Subject to any disclaimer, the term of this patent is extended or adjusted under 35 U.S.C. 154(b) by 906 days.

(21) Appl. No.: 11/975,938

(22) Filed: Oct. 22, 2007

Related U.S. Application Data

(60) Provisional application No. 60/860,406, filed on Nov. 21, 2006.

(51) Int. Cl.
*H04B 3/36* (2006.01)
*B61L 23/00* (2006.01)
*G08B 29/00* (2006.01)

(52) U.S. Cl. ............... 455/8; 455/15; 455/16; 246/1 C; 246/15; 246/162; 340/507; 340/508

(58) Field of Classification Search ....... 455/8; 246/1 C, 246/15, 162; 340/506, 507, 508, 3.42, 3.43, 340/3.44; 701/19, 20
See application file for complete search history.

(56) References Cited

U.S. PATENT DOCUMENTS

| | | | | |
|---|---|---|---|---|
| 4,517,673 A | * | 5/1985 | Brown et al. | 714/10 |
| 5,321,355 A | * | 6/1994 | Luetzow | 324/207.2 |
| 5,369,591 A | * | 11/1994 | Broxmeyer | 701/301 |
| 6,034,944 A | * | 3/2000 | Seki et al. | 370/224 |
| 6,147,592 A | * | 11/2000 | Ulrich et al. | 340/286.07 |
| 6,229,349 B1 | * | 5/2001 | Franckart et al. | 327/77 |
| 6,381,506 B1 | * | 4/2002 | Grappone | 700/79 |
| 6,556,898 B2 | * | 4/2003 | Clawson | 701/19 |
| 2003/0151744 A1 | * | 8/2003 | Fernando et al. | 356/319 |

* cited by examiner

*Primary Examiner* — Duc M Nguyen
(74) *Attorney, Agent, or Firm* — Thompson & Knight LLP; James J. Murphy

(57) ABSTRACT

An interface device for interfacing a set of wayside systems with a radio transmitter includes a plurality of input ports each having at least one input for receiving a signal representing a state of a corresponding wayside system and first and second parallel data paths coupled to the plurality of input ports. Each data path includes input protection circuitry coupled to the inputs of the input ports for preventing short-circuit and open-circuit conditions from triggering a false input state, a multiplexer for selecting between the input port; and a processor for scanning the input ports with the multiplexer to determine the state of current signals appearing at the inputs. In response to determining the state of the current signals appearing at the inputs, the processor generates a message communicating a current state of the wayside systems for delivery to the radio transmitter.

14 Claims, 3 Drawing Sheets

WAYSIDE MONITORING SYSTEMS

CROSS-REFERENCE TO RELATED APPLICATION

The present application claims the benefit of U.S. Provisional Patent Application Ser. No. 60/860,406, filed Nov. 21, 2006.

FIELD OF INVENTION

The present invention relates in general to railroad communications techniques, and in particular, to wayside monitoring systems.

BACKGROUND OF INVENTION

In any transportation industry, reliable communications systems are mandatory for avoiding serious, if not catastrophic, accidents. In the particular case of the railroads, reliable and secure communications must be maintained between railroad central offices, railroad locomotives, service vehicles operating on railway tracks, and wayside systems, among other things. Railroad central offices normally communicate with a network of wireless base stations through wired telecommunications links. These base stations then support wireless communications with locomotives, service vehicles, and wayside systems. Electronic train management systems (ETMS) allow locomotives to communicate directly (peer-to-peer) with the wayside systems and base stations using on-board radios. The locomotives are therefore able to receive, for example, up-to-date wayside aspect information, track database updates, and track authorizations, well before the wayside systems (e.g. signals) are within sight.

Remote wayside interface systems monitor a corresponding set of wayside systems such as signals, switches, and track circuits and directly provide the locomotives with real-time critical aspect and status information. In addition to directly communicating with the locomotives, the wayside interface systems also provide this wayside status and aspect information to the central office via the network of base stations.

Given the criticality of the information being gathered and transmitted, reliability and security are key features in wayside interface system design and construction. Among other things, these systems must accurately ascertain the current state of the monitored signals, switches, and/or track circuits and then transmit that information to oncoming locomotives with minimal error. Furthermore, wayside interface systems must be substantially robust to withstand potentially severe field conditions, as well as be resistant to tampering and similar intentional human interference.

SUMMARY OF INVENTION

The principles of the present invention are embodied in one application in an interface device for interfacing a set of wayside systems with a radio transmitter, which includes a plurality of input ports each having at least one input for receiving a signal representing a state of a corresponding wayside system and first and second parallel data paths coupled to the plurality of input ports. Each data path includes input protection circuitry coupled to the inputs for preventing short-circuit and open-circuit conditions from triggering a false input state, a multiplexer for selecting between the input ports and a processor for scanning the input ports with the multiplexer to determine the state of current signals appearing at the inputs. In response to determining the state of the current signals appearing at the inputs, the processor generates a message for communicating a current state of the wayside systems to the radio transmitter.

Embodiments of the present principles advantageously minimize the chance of a catastrophic accident occurring through the use of redundant processing paths. Within a wayside interface module, dual parallel processing paths independently scan the input signals generated by monitoring devices monitoring a set of wayside systems and independently generate digital messages for transmitting to an associated radio. Opto-isolators or similar input protection circuitry protects against shorts and open-circuits at the interface module inputs from causing false input states. Moreover, the radio system processes the two independently derived messages to independently generate data representing the aspect of the monitored wayside systems (i.e. the current state of the signals, switches, and track circuits. Only if the independently derived aspect data match are those aspect data sent to the locomotives and central office. Hence, a failure of any component on either redundant processing path will cause an unknown aspect report to be generated thereby indicating that caution must be exercised by the train crews and dispatchers.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
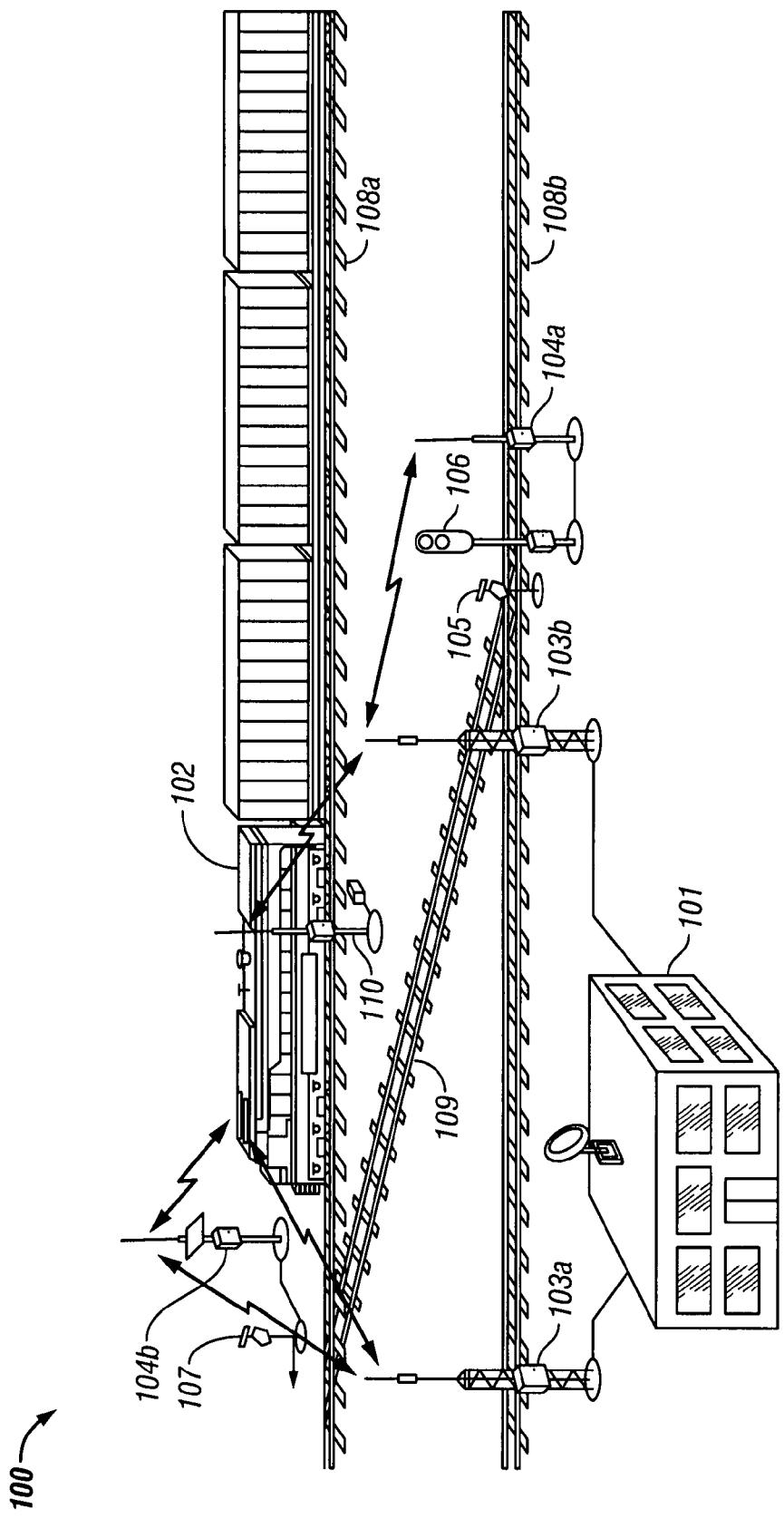
FIG. 1 is a high level diagram illustrating a small portion of a representative railroad communications system suitable for describing one particular embodiment of the principles of the present invention.
Figure 2:
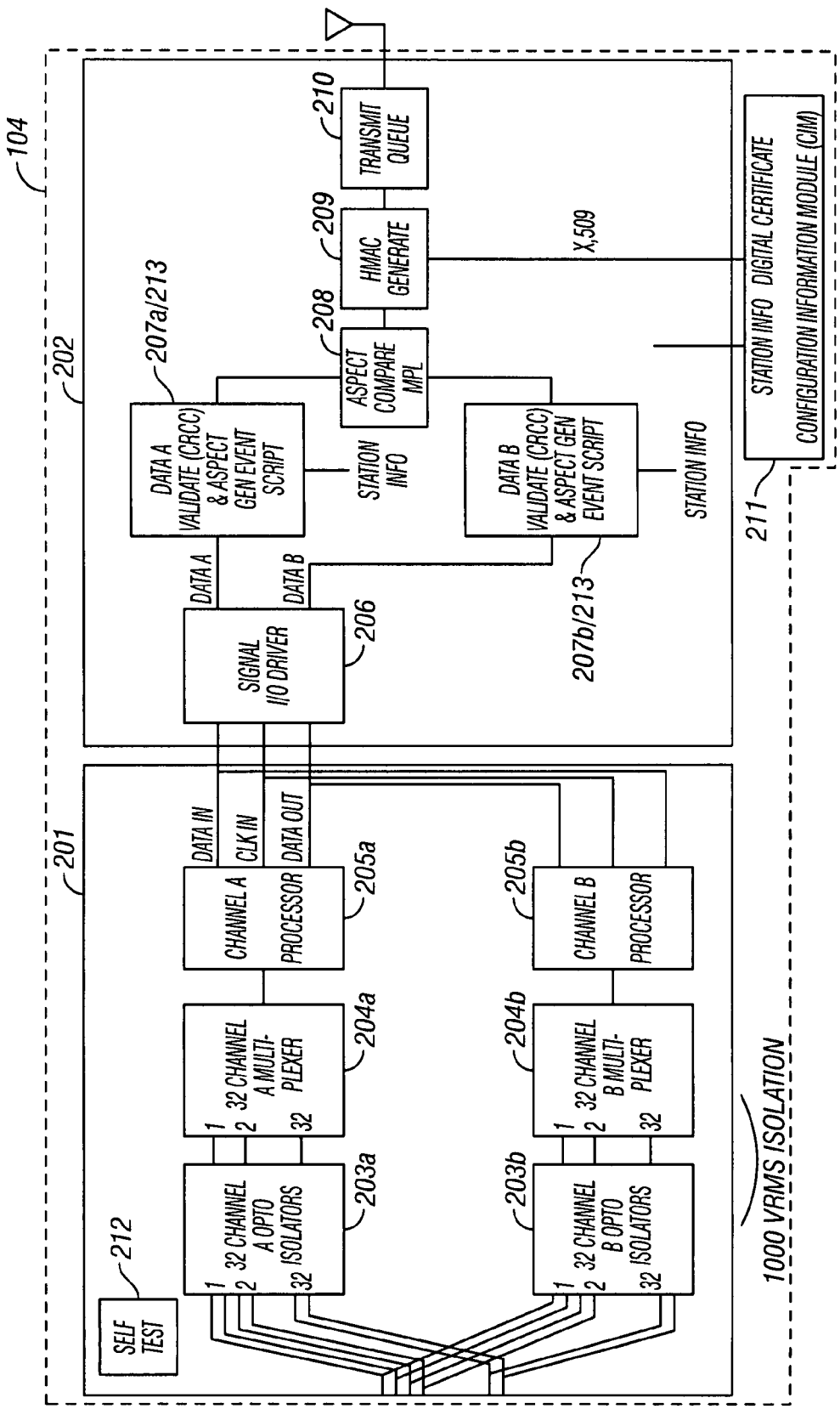
FIG. 2 is a more detailed block diagram of a wayside monitoring subsystem embodying the inventive principles.
Figure 3:
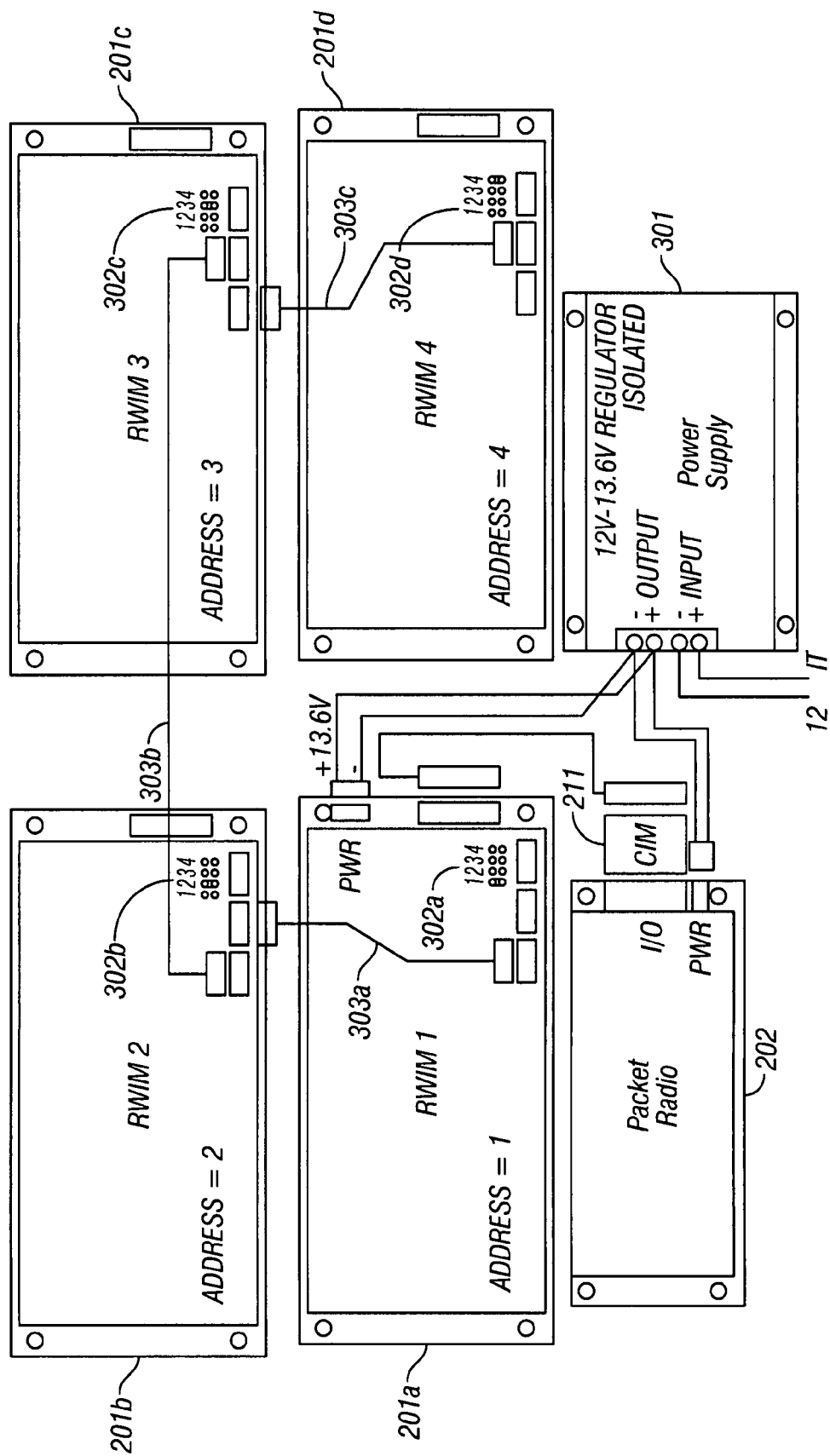
FIG. 3 is a block diagram illustrating a plurality of the wayside monitoring subsystems of FIG. 3 chained together to increase the number of wayside systems that can be monitored.

The principles of the present invention and their advantages are best understood by referring to the illustrated embodiment depicted in FIGS. 1-3 of the drawings, in which like numbers designate like parts.

FIG. 1 is high level diagram showing a small portion of a railroad communications system 100 embodying the principles of the present invention. Generally, system 100 supports wireless communications between a central office (network operating center) 101 and locomotives 102 located at various points around a rail system, direct communications between central office 101 and wayside monitoring systems, as well as direct communications between locomotives 102 and the electronic wayside monitoring subsystems, as discussed below in detail.

In communications system 100, central office 101 communicates with packet radios on locomotives 102 through a wired telecommunications network and a series of packet radio base stations dispersed over thousands of square miles of geographical area through which the rail system operates. In the diagram of FIG. 1, two radio base stations 103*a* and 103*b* are shown for discussion purposes.

Communications system 100 also includes a series of wayside monitoring subsystems, which monitor wayside systems such as signals, switches, and track circuits and communicate the monitored information directly to locomotives 102 within the corresponding wireless coverage area, as well as to central office 101 though base stations 103. FIG. 1 shows two representative wayside monitoring subsystems 104a and 104b. As examples of typical uses of wayside monitoring subsystems 104, wayside monitoring subsystem 104a is shown monitoring a switch 105 and a three-lamp signal 106, and wayside monitoring subsystem 104b is shown monitoring a handthrow switch 109. Also for illustrative purposes, two parallel sections of track 108a and 108b and a connecting track section 109 are shown in FIG. 1, which represent only a very small part of the overall track system.

Communications system 100 also includes a hotbox monitoring subsystem 110 which uses rail-side sensors to allow central office 101 to monitor the axle status of passing trains through packet data radios and wireless base stations 103. In particular, railcar wheels, brakes, and trucks can be monitored for stuck brakes or overheated bearings, such that trains can be slowed or stopped before a catastrophic failure occurs.

FIG. 2 is a functional block diagram of a representative wayside monitoring subsystem 104 embodying the principles of the present invention. Wayside monitoring subsystem 104 includes a redundant wayside interface module (RWIM) 201 and a packet radio 202, both of which will be discussed in further detail below. In the preferred embodiment, packet radio 202 is based on either a Meteor Comm MCC 545C or MCC 6100 packet data radio, although applications of the present inventive principles are not limited thereto.

In the illustrated embodiment, RWIM 201 supports thirty-two (32) input ports of two (2) signal inputs each, or a total of sixty four (64) inputs. The input signals are independently processed in two processing paths or channels (Channels A and B). In exemplary system 100 of FIG. 1, one port could be used to monitor switch 105, one port to monitor each of three lamps of signal 106, and one port to monitor hand throw switch 107. In the preferred embodiment, the inputs into RWIM 201 are provided by Hall Effect sensors or relay contact closures associated with the current paths of the given monitored devices.

In the preferred embodiment, the two signals for each channel are decoded as follows:

0=OFF (not active)
1=ON (active always on)
2=ON Flashing (active and flashing)
3=Failed or Unknown Generally, according to the principles of the present invention, the state of each input is assumed to be safety critical, since reporting of a wrong state may send a false permissive state message to an approaching locomotive resulting in a hazard that could possibly lead to a fatal accident. Advantageously, RWIM 201 utilizes two (2) independent hardware paths to measure and produce two (2) independent sets of status bits for each of two channels channel (Channel A and Channel B). Each set of status bits are then sent to packet radio 202 where two independent software routines compute (by different methods) two aspects representing the overall state of the monitored wayside systems. The aspects are then compared, and if equal, a safety critical message is created and sent to approaching locomotive 102 and central office 101.

As shown in FIG. 2, the thirty-two (32) two-bit input ports of each channel drive corresponding opto-isolation diodes 203a-203b. The signal path for each input signal has an input source path and an input return path from the corresponding Hall Effect sensor or relay contact closure. In the illustrated embodiment, opto isolation divides 203a-203b provide greater than 2000 VRMS of isolation between the input return path and board ground. To activate any single input, i.e. to make the corresponding output on isolator block 203a-203b transition to an ACTIVE (ON) state, current must flow from the input source path through the opto-isolation diode to the input return path. Hence, an input short (across the input source and return paths) or an input open (i.e. a broken wire) will not cause an ACTIVE state at the corresponding output of opto isolation diode blocks 203a-203b.

In the illustrated embodiment, the input threshold voltage required to activate any input is five (5) volts: Specifically to ensure that the input state is OFF, the input voltage must be less than four (4) volts and to ensure the input state is ON, the voltage must be greater than six (6) volts. Input hysteresis is greater than one-half (½) volt.

The outputs from opto isolation diodes 203a-203b are provided to corresponding thirty-two (32) by two-bit input multiplexers 204a-204b. Multiplexers 204a-204b are under the control of corresponding Channel A or Channel B PIC processor 205a-205b. In particular, processors 205a-205b scan the corresponding thirty-two (32) input ports of each channel to determine the states of the inputs of that channel. In the preferred embodiment, processors 205a-205b scan the associated thirty-two (32) input ports over approximately two (2) milliseconds, dwelling on each input port for about sixty (60) microseconds. The scans are repeated approximately every eleven (11) milliseconds. Since some inputs may represent flashing signal lamps, approximately three (3) seconds is required to determine the state of the channels (based on an assumed flashing rate of one (1) to two (2) seconds and a flashing duty cycle of 40/60 to 60/40).

Data generated by each processor 205a-205b is formed into a packet that contains an address associated with that processor, the processed channel data, a sequence number used to identify current data, and a thirty-two (32) bit CRCC that covers the address, data, and sequence number. The sequence number increments every time new data are placed in the given processor output buffer, which is typically every three (3) seconds. Data are also placed in the processor output buffer whenever the given processor 205a-205b detects a state change on any input.

Data are transferred between RWIM 201 and packet radio 202 via a serial bus including a DATA IN line, a CLOCK IN line, and a DATA OUT line, along with ground. In the preferred embodiment, the serial bus is CMOS driven (either 5.0 V or 3.3 V depending on the particular embodiment) and supports a cable between RWIM 201 and packet radio 202 of up to fifteen (15) feet.

Packet radio 202 operates through a signal I/O driver 206 and includes two (2) parallel processes 207a and 207b, which are implemented on a processor platform 214 and independently process the messages received from RWIM processors 205a and 205b. Packet radio processes 207a-207b operate as the bus master for the serial bus by supplying the clock via the CLOCK IN line and control signals via the DATA IN line. Data are transmitted from RWIM processors 205a and 205b to packet radio processes 207a and 207b on the DATA OUT line.

Packet radio processes 207a and 207b operate on their respective messages using two (2) different processing algorithms. In the preferred embodiment, packet radio processes 207a uses a state machine to cycle through the status bits received in the messages from RWIP processor 205a to generate a set of aspect bits representing the current overall state of the monitored signals, switches, and track circuits. This state machine may, for example, operate in response to a script downloaded to packet radio 202 through a serial port.

The two sets of aspect bits respectively generated by processes 207a and 207b are then compared in aspect compare block 208, and if they match, the aspect is validated. Otherwise, if the two sets of aspect bits do not match, the aspect is tagged as invalid (i.e. a "99" aspect). The results are packaged into a message and a key-hashed message authentication code (HMAC) key is appended using a digital certificate (X.509), provided through the serial port of CIM 211, by HMAC block 209. (Onboard locomotive computers match the HMAC key to their internal database to verify that the source of the data is indeed from the proper sending wayside monitoring subsystem 104.)

The generated wayside message is placed in the transmit queue 210. Messages are sent to the locomotives 102 whenever there is an aspect change or when polled by a locomotive 102. Similarly, messages are sent to central office 101 whenever an aspect change occurs or when the central office 101 polls the wayside monitoring subsystem 104.

Configuration Information Module (CIM) 211 is a memory device that stores site specific configuration files through the use of a script file associated with radio 202. (Generally, a site can be a locomotive, hyrail vehicle, wayside subsystem, hot box, or the like.) In particular, CIM 211 is locked to the corresponding site and is connected to the associated radio 202. CIM 211 then stores radio configuration information, which is specific to the particular needs of the site.

RWIM 201 can interface with any monitoring device capable of forcing current through the opto isolation diodes 203a-203b, including, for example, mechanical switches and relays, solid state relays, and Hall Effect sensors. In the illustrated embodiment, RWIM 201 is provided with self-test circuitry 212, which allows Hall Effect sensors, when used, to be tested by forcing a current through the sensor to attempt to cause their output to change state.

In the preferred embodiment, RWIM 201 also has six (6) opto isolated outputs (not shown), with greater than two thousand (2000) VRMS isolation that can be used to wake-up track circuits or turn on signals. These outputs are not considered safety critical and are implemented on only one of the two data processing channels.

The RWIM channel capacity can be expanded up to one hundred and twenty eight (128) inputs by daisy chaining up to four (4) RWIMs 201a-201d, as shown in FIG. 3. In the illustrative embodiment of FIG. 3, RWIMs 201a-201d operate in conjunction with packet radio 202 and a power supply 301. A corresponding set of jumpers 302a-302d allow each RWIM 201a-201d to be individually addressed. Standard RS 232 connections 303a-303b allow data from the corresponding RWIM processors 205a-205b to pass through to the signal drivers 206 of packet radio 202. RWIMs 201a-201d may be separated up to the maximum allowed by RS232 signal levels (>100 feet).

Advantageously, the redundant design of wayside monitoring subsystem 104 ensures that a failure of any component on either channel will cause an unknown aspect report to be generated. Hence, a receiving locomotive 102 or central office 101 is actively notified in real-time of a potential hazardous, rather than receiving erroneous information that could lead to a catastrophic accident.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for monitoring a set of wayside systems comprising:
   a set of monitoring devices for generating a plurality of signals representing the current states of the wayside systems;
   an interface device comprising:
      a plurality of inputs coupled to the monitoring devices for receiving the signals representing the states of the wayside systems; and
      a plurality of parallel data processing paths for independently processing the signals received at the plurality of inputs and independently generating messages for communicating the current states of the wayside systems, comprising:
         a first interface processor for receiving the signals and generating a first set of messages each including a first set of status bits representing the states of the wayside systems and an error detection code; and
         a second interface processor for receiving the signals and generating a second set of messages each including a second set of status bits representing the states of the wayside systems and an error detection code; and
   a radio for communicating with a locomotive and including at least one radio processor for executing a plurality of radio processes, each radio process operating on the messages from a corresponding one of the first and second processors of the data processing paths with a different algorithm and independently calculating from the status bits sets of aspect bits representing a current overall aspect of the wayside systems for use in generating a message including aspect information and authentication information for radio transmission to the locomotive.

2. The system of claim 1, wherein the set of monitoring devices is selected from the group consisting of mechanical switches and relays, solid state relays, and Hall Effect sensors.

3. The system of claim 1, wherein the interface comprises input protection circuitry coupled to the inputs for preventing short-circuit and open-circuit conditions from producing signals representing false wayside system states.

4. The system of claim 3, wherein the input protection circuitry comprises opto-isolators.

5. The system of claim 1, wherein each data processing path comprises a multiplexer for selecting between the inputs and a processor for scanning the inputs with the multiplexer to determine the state of current signals appearing at the inputs and in response independently generate the messages.

6. The system of claim 1, wherein the state of each wayside system is represented by at least two signals generated by the monitoring devices and provided to at least two corresponding ones of the inputs.

7. The system of claim 1, wherein the radio further comprises comparator circuitry for comparing the aspect bits independently generated by the radio processes and communications circuitry for generating and transmitting a message when the independently generated aspect bits match.

8. The system of claim 1, wherein the data paths independently generate messages including bits representing the states of the wayside systems, a sequence number, a cyclic redundancy check field, and an address corresponding to the processor.

9. The system of claim 1, wherein the data paths and the radio processes communicate via a serial bus.

10. A communications system comprising:
   an interface device including:
      a plurality of inputs for coupling to the monitoring devices for receiving signals representing a state of the at least one wayside system; and
      a plurality of parallel data processing paths for independently processing the signals received at the plurality of inputs and independently generating messages including bits representing the state of the at least one wayside system, comprising:
         a first interface processor for receiving the signals and generating a first set of messages each including a first set of status bits representing the states of the wayside systems and an error detection code; and
         a second interface processor for receiving the signals and generating a second set of messages each including a second set of status bits representing the states of the wayside systems and an error detection code; and
   a radio for communicating with a locomotive including at least one radio processor for executing first and second radio processes, wherein each of the first and second radio process operates on messages from a corresponding one of the first and second processors of the data processing paths using a different processing algorithm to independently calculate from the status bits a set of aspect bits representing a current overall aspect of the wayside systems, wherein the radio processor compares the aspect bits independently generated by the first and second radio processes and generates for radio transmission to the locomotive a message including aspect information and authentication information when the independently generated aspect bits match.

11. The communications system of claim 10, wherein each parallel data processing path comprises:
   a plurality of opto-isolators coupled to the inputs for preventing short-circuit and open-circuit conditions at a selected input from triggering a false input state;
   a multiplexer for selecting between the inputs; and
   a processor for scanning the inputs with the multiplexer to determine the levels of signals appearing at the inputs and in response independently generate the corresponding messages.

12. The communications system of claim 10, further comprising a serial bus for coupling outputs of the parallel data processing paths with the radio.

13. The communications system of claim 12, wherein the serial bus comprises a data line for receiving data from the radio, another data line for transmitting data to the communications system, and a clock line for carrying a clock signal.

14. The communications system of claim 12, wherein the serial bus is adapted for chaining the interface device with another interface device.

* * * * *